United States Patent Office 3,756,919
Patented Sept. 4, 1973

3,756,919
PROCESS FOR THE PRODUCTION OF NON-HAZING STARCH CONVERSION SYRUPS
Irving Fransen Deaton, La Grange, Ill., assignor to CPC International Inc.
No Drawing. Filed Sept. 16, 1970, Ser. No. 73,198
Int. Cl. C12b 1/00; C12c 11/04; C12d
U.S. Cl. 195—31 R
17 Claims

ABSTRACT OF THE DISCLOSURE

This invention discloses a process for the production of a non-hazing starch conversion syrup having a D.E. of from about 5 to about 15 which comprises first hydrolyzing starch to a D.E. of from about 20 to about 43 and thereafter subjecting the resulting starch conversion syrup to molecular exclusion until the D.E. of the syrup has been reduced to from about 5 to about 18.

---

The present invention relates to a process for the production of non-hazing, low D.E. starch conversion syrups.

The term D.E. is an abbreviation for dextrose equivalent, and is used herein to refer to the reducing value of dissolved solids in a starch hydrolysate expressed as percent dextrose, as measured by the Luff-Schorl method (NBS Circular C-40, page 195 as appearing in "Polarimetry, Saccharimetry and Sugars," authors Frederick J. Bates and associates).

There is a large market for starch conversion syrups with bland taste, low sweetness and low hydroscopicity at a low D.E. value. Such syrups are useful as bases for the preparation of food items as well as for bodying agents and as additives having non-sweet, water-holding, non-hygroscopic characteristics. Other applications include their use as a carrier for synthetic sweeteners, as a flavor enhancer, as an additive for coloring agents, as a spray drying adjunct for coffee extracts or tea extracts, as a bulking, bodying or dispersing agent in synthetic creams or coffee whiteners, as moisture holding agents in breads, pastries, meats, and as a bodying and smoothing agent in puddings, soups and frozen iced desserts.

In many of the described applications, it is desirable to utilize a starch conversion syrup which exhibits extreme clarity and which will not develop haze upon standing. While such non-hazing characteristics are readily imparted to starch conversion syrups having high D.E. values such as above about 20, it has been difficult to produce low D.E. starch conversion syrups having non-hazing properties. Typically, starch conversion syrups having a D.E. below about 18 are subject to development of haze upon standing. In extreme cases, such syrups become completely opaque and gel into a paste. In less extreme cases, haze particles settle to the bottom of the syrup and resemble a sludge. In other cases, the haze particles merely remain in suspension, lending the syrup a cloudy appearance.

It has now been found that starch conversion syrups having a D.E. of from about 5 to about 18 can be prepared which do not haze or form suspended matter upon standing. More particulraly, it has been found that non-hazing aqueous starch conversion syrups having a solids content of from about 60% to about 85% by weight and a D.E. of from about 5 to about 18 can be prepared by a process which comprises first hydrolyzing starch to a D.E. of from about 20 to about 43 and thereafter subjecting the resulting starch conversion syrup to molecular exclusion until the D.E. of the syrup has been reduced to from about 5 to about 18.

The initial starch, which is subjected to hydrolysate treatment, may be derived from a wide variety of starch materials, such as cereal starches, waxy starches, and/or root starches. Typical of these starches are corn starch, potato starch, tapioca starch, grain sorghum starch, waxy milo starch, waxy maize starch, and the like.

The hydrolyzing of the starch to a D.E. of from about 20 to about 43 can be carried out by acid, enzyme, or a combination of acid and enzyme conversions. In one method, referred to in Example I as Method A, a starch such as a corn starch is treated with a single enzyme application of bacterial alpha-amylase. More specifically, an aqueous slurry of a starch, having a solids content less than about 50% by weight is subjected to the hydrolytic action of bacterial alpha-amylase under suitable conditions to produce the starch hydrolysate.

The hydrolysis may also be performed via a number of other routes. For example, a mixture of starch and water having a solids content of less than about 50% by weight can be subjected to the hydrolytic action of acid at a pH of from 1 to about 4 until a D.E. of from about 20 to about 43 is reached. In another route, a mixture of starch and water having a solids content less than 50% may be first subjected to the hydrolytic action of a bacterial alpha-amylase followed by a high temperature heating step to solubilize any insoluble starch. Since this temperature tends to inactivate the enzyme, it is then necessary to cool the solubilized partial hydrolysate and subject it to a second hydrolysis by treatment with additional bacterial alpha-amylase to obtain the final starch hydrolysate having a D.E. of from about 20 to about 43. This method is referred to as the enzyme-enzyme technique in Method B of Example I.

In a preferred embodiment, the enzyme-enzyme technique comprises slurrying starch in water to a solids concentration of between about 10% and about 50%; solubilizing the starch above the gelatinization temperature of the starch; subjecting the mixture to treatment with bacterial alpha-amylase to hydrolyze the starch to a D.E. between about 5 and about 15; heating the starch hydrolysate to a temperature greater than about 95° C. and preferably between about 110° and 150° C.; cooling the starch hydrolysate to a temperature less than 95° C.; and subjecting the hydrolysate to further treatment with additional bacerial alpha-amylase or saccharifying enzyme to hydrolyze the starch to a D.E. between about 20 and 43.

A further method of hydrolyzing starch comprising an acid-enzyme technique referred to as Method C in Example I, consists of hydrolyzing a mixture of starch and water by the action of acid to reach a D.E. between about 5 and about 15. The partial hydrolysate is subsequently subjected to the action of bacterial alpha-amylase or a saccharifying enzyme to obtain a starch hydrolysate having a D.E. of from about 20 to about 43.

In a preferred embodiment, the acid-enzyme technique comprises subjecting a mixture of starch and water having a solids content of from about 10% to about 50% by weight to the hydrolytic action of acid at a pH of from about 1 to about 4 to obtain a hydrolysate having a D.E. between about 5 and about 15; and subjecting the resulting hydrolysate to the hydrolytic action of bacterial alpha-amylase at a temperature of from about 50° C. to about 95° C. at a pH of from about 6 to about 8 to further hydrolyze the hydrolysate to a D.E. of from about 20 to about 43.

After termination of the hydrolysis, the resulting conversion syrups have a solids content below about 50% by weight. Refining of the syrup is achieved by conventional refining methods, such as treating with vegetable carbon, ion exchange resins, filtration, centrifugation, and the like.

EXAMPLE I

The following specific procedures illustrate the above-described basic methods for preparing the starch hydrolysate used in this invention, and their use in producing products in accordance with the present invention.

Method A.—One-step enzyme technique

An aqueous starch slurry is prepared containing 30% solids by weight of waxy milo starch. A bacterial alpha-amylase is added; for example, 0.03% dry basis Miles HT-1000. The temperature of the slurry is raised and held between 80° C. and 95° C. The mixture is held at this temperature for about one-half to two hours. The temperature can then be reduced to about 80° C. and the conversion is allowed to continue until the desired D.E. is reached. The conversion is terminated by lowering the pH of the conversion product to about 4.0 to 5.0 with the addition of dilute hydrochloric acid solution.

Method B.—Two-step enzyme-enzyme technique

Unmodified corn starch is slurried in water to provide an aqueous suspension containing 28–32% by weight of the unmodified corn starch. The pH is at 7.5–8.0. To this mixture is added bacterial alpha-amylase, for example, Miles HT-1000 in an amount of 0.05% based on starch solids. This starch-enzyme suspension is added over a 30 minute period to an agitated tank maintained at a temperature of 80–95° C. After completion of starch addition, liquefaction is continued for about 60 minutes, after which time the hydrolysate is within the D.E. range of 2 to 5. The liquefied starch is then heated to 150° C. and held at this temperature for 8 minutes. The heat treatment destroys residual enzyme activity and results in improved filtration rates and in decreased yield losses upon filtration of the final hydrolysate. The liquor is then cooled to 80–90° C., redosed with enzyme, and allowed to convert to the desired D.E., between about 20 and about 43.

Method C.—Two-step, acid-enzyme technique

A sample of corn starch is slurried in water providing a slurry having a concentration ranging from 14° to 22° Bé. This slurry is acid hydrolyzed to about 5 D.E. After acid hydrolysis, the slurry is neutralized to a pH between 6 and 7. The neutralized liquor is cooled to between 80° C. and 90° C., and dosed with bacterial alpha-amylase (HT-1000). A final D.E. of 20 to 43 is obtained in each of the samples in a period of time between 2 and 24 hours.

As previously indicated, after hydrolyzing the starch to a D.E. of from about 20 to about 43, the resulting starch conversion syrup is subjected to molecular exclusion until the D.E. of the syrup has been reduced to from about 5 to about 18. Molecular exclusion comprises passing the conversion syrup through a column or bed of a porous and generally granular media. The reduction of the D.E. of the syrup is effected by the difference in the rate at which molecules of varying size diffuse into the pores of this media. The larger molecules representing the lower D.E. fraction of the syrup diffuse more slowly and, therefore, pass more quickly through the bed than the smaller molecules representing the higher D.E. fraction.

The reduction of the D.E. of the syrup by molecular exclusion can be effected in a fixed bed of a porous media having sufficiently large pores to admit the smaller molecules being separated. The reduction of the D.E. of the syrup by molecular exclusion can also be effected in a countercurrent moving bed of a porous media having sufficient mechanical strength to withstand handling. Examples of porous media that can be used are ion exchange resins, granular forms of dextran, argarose and polyacrylamide gels, porous glass beads and activated carbon or alumina.

The preferred porous medium suitable for the molecular exclusion step of the present invention are ion exchange resins. The ion exchange resins which can be readily used in the present process are the metal salts of strongly acid nuclearly sulfonated resins having a cross-linked vinylaromatic resin matrix. Typically, these resins are nuclearly sulfonated polymers or copolymers of vinylaromatic compounds, such as styrene, vinyltoluene, vinylxylene, and the like that have been cross-linked in molecular structure to an extent rendering the sulfonated polymers and copolymers insoluble in aqueous solutions of acids, bases, or salts. An example of a suitable resin for the molecular exclusion step of the process of the present invention, is the sodium or potassium form of "DOWEX 50W–X4" of Dow Chemical Company. This resin is a 50 to 100 mesh sulfonated copolymer of styrene and divinylbenzene having 4% divinylbenzene linkages.

Molecular exclusion can be carried out by passing the conversion syrup through a bed or column of the porous media of sufficient depth to effect the reduction of the syrup to the desired D.E. ranging within the limits heretofore described. The starch conversion syrup is preferably passed through the bed of porous media at elevated temperatures, to reduce the viscosity of the syrup thereby improving its flow rate through the column. The temperature of the media itself can also be maintained at a level similar to that of the syrup. Useful syrup and media temperatures which can be used in the present process range from about 100° F. to about 200° F., and preferably, from about 110° F. to about 170° F.

When the molecular exclusion step of the process of this invention is carried out as a batch process, the aqueous starch hydrolysate having a D.E. of from about 18 to about 43 after being heated to a temperature as heretofore indicated, is applied to the porous media column. The column is then washed with water and the effluent collected. The early portions of the effluent having a D.E. from about 5 to about 18 are collected to yield the non-hazing starch conversion syrups of the present invention. This product can then be concentrated to a solids content ranging from about 60% to about 85% by weight for use in commercial applications.

When the molecular exclusion step of the present process is carried out in a continuous manner, the supply liquor comprising the search hydrolysate having a D.E. of from about 20 to about 43 is fed into a column of the porous media in which the media is moved continuously or incrementally in a countercurrent relation to the supply liquor. This procedure permits the continuous flow of supply liquor and results in a continuous product of starch conversion syrup having a D.E. of from about 5 to about 15, while requiring a constant supply of fresh media. The spent porous media containing the high D.E. fraction of the supply liquor can be readily regenerated by washing the resin with water can then be recycled to the fresh resin supply. The particular D.E. of the non-hazing starch conversion syrup product can be controlled by adjusting the media supply rate in respect to the supply liquor rate and/or the contacting time in the column.

The molecular exclusion step of the process of the present invention is more specifically illustrated in the following examples.

EXAMPLE II

Molecular exclusion using a fixed bed column

A fixed bed molecular exclusion column, having a diameter of 7 cm. and a length of about 4 feet, was filled to a bed depth of about 62.5 cm. with a sulfonated polystyrene ion exchange resin in the sodium form (Dowex 50W–X4). The column was first filled with water and was heated to a temperature of about 140° F. A starch hydrolysate syrup prepared in accordance with Example I, and having a D.E. of between about 22 and about 24, was heated to a temperature of about 140° F. and was applied onto the column. The column was then eluted with distilled water (3200 ml.). The effluent from the column was collected in 19 fractions of 200 ml. each. The fractions 5, 6, and 7, were combined and were concentrated by evaporating the water to 40° Bé to yield a non-hazing syrup of this invention, having a D.E. of 11.

EXAMPLE III

Molecular exclusion using a countercurrent moving bed

A molecular exclusion column having an inner diameter of 1⅜ inches and a length of about 4 feet was filled to a bed depth of 100 cm. with a sulfonated polystyrene ion exchange resin in the sodium form (Dowex 50W–X4). A starch hydrolysate syrup prepared in accordance with Example I and having a D.E. of about 22.5 was fed into the bottom of the column at a rate of about 5 ml. per minute. After every addition of 50 ml. of supply liquor, 100 ml. of the resin was removed from the bottom of the column and was replaced with a similar amount of new or regenerated resin at the top of the column. The used resin withdrawn from the column was vacuum filtered to remove the hydrolysate liquor contained therein and this liquor was recycled into the supply liquor. The filtered resin was washed to recover the higher D.E. product. The lower D.E. product liquor was continuously withdrawn from the top of the column. The column was operated in this manner for a period of about 20 hours to yield a non-hazing starch conversion syrup having the following properties:

| Sample number | After hours of operation | Dry substance | D.E. |
|---|---|---|---|
| 1 | 5.25 | 4.5 | 6.0 |
| 2 | 9.5 | 9.3 | 9.0 |
| 3 | 13.25 | 13.2 | 11.5 |
| 4 | 16.25 | 14.6 | 13.7 |
| 5 | 19.0 | 9.5 | 12.2 |
| 6 | 20 0 | 12.7 | 12.7 |

EXAMPLE IV

Molecular exclusion using A countercurrent moving bed column

A molecular exclusion column having an inner diameter of 1⅜ inches and a length of about 4 feet is filled to a bed depth of 100 cm. with activated carbon. A starch hydrolysate syrup prepared in accordance with Example I and having a D.E. of about 43 is fed into the bottom of the column at a rate of about 5 ml. per minute. After every addition of 50 ml. of supply liquor, 100 ml. of the carbon is removed from the bottom of the column and is replaced with a similar amount of new or regenerated carbon at the top of the column. The used carbon withdrawn from the column is vacuum filtered to remove the hydrolysate liquor contained therein and this liquor is recycled into the supply liquor. The filtered carbon is washed to recover the higher D.E. fraction. The lower D.E. product liquor is continuously withdrawn from the top of the column. The column is operated in this manner to yield a non-hazing starch conversion syrup of this invention.

EXAMPLE V

Molecular exclusion using a countercurrent moving bed column

A molecular exclusion column having an inner diameter of 1⅜ inches and a length of about 4 feet is filled to a bed depth of 100 cm. with porous glass beads. A starch hydrolysate syrup prepared in accordance with Example I and having a D.E. of about 20 is fed into the bottom of the column at a rate of about 5 ml. per minute. After every addition of 50 ml. of supply liquor, 100 ml. of the glass beads is removed from the bottom of the column and is replaced with a similar amount of new or regenerated beads at the top of the column. The used glass beads withdrawn from the column are vacuum filtered to remove the hydrolysate liquor contained therein and this liquor is recycled into the supply liquor. The filtered beads are washed to recover the higher D.E. fraction. The lower D.E. product liquor is continuously withdrawn from the top of the column. The column is operated in this manner to yield a non-hazing starch conversion syrup of this invention.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

I claim:

1. A process for the production of a non-hazing starch conversion syrup having a D.E. from about 5 to about 18 which comprises hydrolyzing starch to obtain a starch conversion syrup having a D.E. of from about 20 to about 43 and thereafter subjecting the resulting starch conversion syrup to molecular exclusion until the D.E. of the starch conversion syrup has been reduced to from about 5 to about 18 to thereby obtain an effluent which is a non-hazing starch conversion syrup having a D.E. of from about 5 to about 18.

2. The process of claim 1 wherein the hydrolysis is a single stage acid hydrolysis and the starch is corn starch.

3. The process of claim 1, wherein hydrolyzing starch comprises subjecting an aqueous slurry of starch having a solids content below about 50% by weight to the hydrolytic action of bacterial alpha-amylase.

4. The process of claim 1, wherein hydrolyzing the starch comprises slurrying starch in water to a solids concentration of between about 10% and about 50%, solubilizing the starch above the gelatinization temperature of the starch, subjecting the mixture to treatment with bacterial alpha-amylase to hydrolyze the starch to a D.E. between about 2 and about 15, heating the starch hydrolysate to a temperature greater than about 95° C. and subjecting the hydrolysate to further treatment with additional bacterial alpha-amylase to hydrolyze the starch to a D.E. between about 20 and 43.

5. The process of claim 1, wherein hydrolyzing starch comprises subjecting a mixture of starch and water having a solids content of from about 10% to about 50% by weight to the hydrolytic action of acid at a pH of from about 1 to about 4 to obtain a hydrolysate having a D.E. between about 5 and about 15, and subjecting the resulting hydrolysate to the hydrolytic action of bacterial alpha-amylase at a temperature of from about 50° C. to about 95° C. at a pH of from about 6 to about 8 to further hydrolyze the hydrolysate to a D.E. of from about 20 to about 43.

6. The process of claim 1, wherein molecular exclusion comprises passing the conversion syrup through a bed of porous media.

7. The process of claim 6 wherein the porous media is an ion exchange resin in the neutral form.

8. The process of claim 6, wherein the ion exchange resin is a metal salt of a strongly acid, nuclearly sulfonated resin having a cross-linked vinyl aromatic resin matrix.

9. The process of claim 6, wherein the molecular exclusion is carried out at a temperature of from about 100° F. to about 200° F.

10. The process of claim 1, wherein molecular exclusion is effected in a countercurrent moving bed of porous media.

11. A process for the production of a non-hazing starch conversion syrup having a D.E. of from about 5 to about 18 which comprises subjecting a starch conversion syrup having a D.E. of from about 20 to about 43 to molecular exclusion until the D.E. of the syrup has been reduced to from about 5 to about 18 to thereby obtain an effluent which is a non-hazing starch conversion syrup having a D.E. of from about 5 to about 18.

12. The process of claim 11, wherein molecular exclusion comprises passing the conversion syrup through a bed of porous media.

13. The process of claim 12, wherein the porous media is an ion exchange resin in the neutral form.

14. The process of claim 13, wherein the ion exchange resin is a metal salt of a strongly acid, nuclearly sulfonated resin having a cross-linked vinyl aromatic resin matrix.

15. The process of claim 12, wherein the molecular exclusion is carried out at a temperature of from about 100° F. to about 200° F.

16. The process of claim 11, wherein the molecular exclusion is effected in a countercurrent moving bed of porous media.

17. A process for treating starch which comprises subjecting starch to hydrolysis with an acid to produce a starch hydrolysate and subjecting the said hydrolysate to fractionation by molecular exclusion to separate two fractions having different dextrose equivalent values, wherein the first of said fractions is a non-hazing starch conversion syrup having a D.E. of from about 5 to about 18.

References Cited

UNITED STATES PATENTS

| | | | |
|---|---|---|---|
| 3,663,369 | 5/1972 | Morehouse et al. | 195—31 R |
| 2,954,305 | 9/1960 | Grosvenor | 127—9 |
| 3,002,823 | 10/1961 | Flodin et al. | 195—66 R |
| 3,184,334 | 5/1965 | Sargent | 195—31 R |
| 3,305,395 | 2/1967 | Scallet et al. | 127—46 B |
| 3,490,922 | 1/1970 | Hurst | 195—31 R |
| 3,586,513 | 6/1971 | Horn et al. | 195—31 R |

OTHER REFERENCES

Cortis-Jones, Int. Sugar, J., vol. 64, pp. 133–135, 1962.

Nordin, P., Arch. Biochem. Biophys., vol. 99, pp. 101–104, 1962.

Corn Syrups and Sugars, 2d Ed., p. 32, 1958, published by Corn Industries Research Foundation, Inc.

A. LOUIS MONACELL, Primary Examiner

T. G. WISEMAN, Assistant Examiner

U.S. Cl. X.R.

99—142

UNITED STATES PATENT OFFICE
CERTIFICATE OF CORRECTION

Patent No. 3,756,919     Dated September 4, 1973

Inventor(s) Irving Fransen Deaton

It is certified that error appears in the above-identified patent and that said Letters Patent are hereby corrected as shown below:

Column 1, line 30, "hydroscopicity" should read ---hygroscopicity---;

Column 4, line 39, "search" should read ---starch---.

Signed and sealed this 18th day of December 1973.

(SEAL)
Attest:

EDWARD M. FLETCHER, JR.
Attesting Officer

RENE D. TEGTMEYER
Acting Commissioner of Patents